United States Patent
Klane et al.

(10) Patent No.: US 6,418,732 B1
(45) Date of Patent: Jul. 16, 2002

(54) PROCESS AND DEVICE FOR COOLING EXTRUDED HOLLOW SECTIONS

(75) Inventors: Bernd Klane, Munich; Andreas Praller, Wolfratshausen, both of (DE)

(73) Assignee: Linde Technische Gase GmbH, Hollriegelskreuth (DE)

(*) Notice: Subject to any disclaimer, the term of this patent is extended or adjusted under 35 U.S.C. 154(b) by 0 days.

(21) Appl. No.: 09/019,196

(22) Filed: Feb. 5, 1998

(30) Foreign Application Priority Data

| Feb. 5, 1997 | (DE) | 197 04 363 |
| Apr. 30, 1997 | (EP) | 97107226 |
| Aug. 22, 1997 | (DE) | 197 36 644 |

(51) Int. Cl.[7] .............................. F25D 13/06
(52) U.S. Cl. ................ 62/63; 62/384; 62/605
(58) Field of Search ................ 62/63, 384, 605

(56) References Cited

U.S. PATENT DOCUMENTS

| 3,661,483 A | * | 5/1972 | Bose | 62/384 |
| 3,744,262 A | * | 7/1973 | Bose | 62/384 |
| 3,771,931 A | | 11/1973 | Fischer et al. | 425/72 |
| 4,069,282 A | * | 1/1978 | Gutermuth et al. | 264/28 |
| 4,088,724 A | | 5/1978 | Kuhnet | 264/85 |
| 4,526,526 A | | 7/1985 | Krogh | 425/71 |
| 4,640,099 A | * | 2/1987 | Gibot | 62/384 |
| 5,028,376 A | | 7/1991 | Vanderwoude | 264/566 |
| 5,475,981 A | * | 12/1995 | Becker | 62/605 |

FOREIGN PATENT DOCUMENTS

| DE | 23 24 133 | 11/1974 |
| DE | 24 56 386 | 6/1976 |
| DE | 0047378 | 3/1982 |
| DE | 33 15 202 C2 | 11/1983 |
| EP | 0795389 A1 | 9/1997 |

OTHER PUBLICATIONS

Lingenheil et al. (1997) *Eiskalte Innenseite* Junststaffe 87 pp. 162 164.

* cited by examiner

*Primary Examiner*—Ronald Capossela
(74) *Attorney, Agent, or Firm*—Millen, White, Zelano & Branigan, P.C.

(57) ABSTRACT

A process and device is provided for cooling extruded hollow sections, especially pipes, that are made of plastic. Liquid or supercritical carbon dioxide is directed into the interior of the plastic hollow section through an extruder head and is depressurized in at least one depressurization nozzle, whereby carbon dioxide in gaseous and solid form is produced. The carbon dioxide that is in gaseous form is directed to the inner wall of the hollow section, while carbon dioxide snow is brought into heat exchange with the inner wall of hollow section only to the extent that the latter is not damaged.

24 Claims, 4 Drawing Sheets

PROCESS AND DEVICE FOR COOLING EXTRUDED HOLLOW SECTIONS

FIELD OF THE INVENTION

The invention relates to a process for cooling extruded hollow sections, especially pipes, that are made of plastic, whereby liquid or supercritical carbon dioxide is directed through the extruder head and depressurized and the interior of the plastic hollow section is cooled with the carbon dioxide in gaseous form that is produced. The invention also relates to a device for cooling extruded hollow sections that are made of plastic with at least one feeder for liquid or supercritical carbon dioxide, which runs through the extruder head into the interior of the hollow section and which has at least one depressurization nozzle.

BACKGROUND OF THE INVENTION

In the extrusion of plastic pipes, frequently only the exterior of the extruded pipes is cooled with water. In this case, cooling is done in a downstream calibrating and cooling segment. Especially in the case of thick-walled pipes, this type of cooling leads to only slow heat exchange. The ejection output of such plastic extrusion units is therefore limited basically by the cooling speed of the plastic, as well as of the calibrating form. Extending the cooling segment to increase ejection output is very costly and is possible only to a limited extent.

DE-OS 24 56 386, incorporated herein by reference, therefore proposes a process in which an extremely cold medium that evaporates or is sublimated there, especially liquid nitrogen, is sprayed into the interior of the plastic pipe in the area of the calibrating form. Also known from DE-OS 23 24 133, incorporated herein by reference, is a process for outer calibration of extruded hollow sections that are made of thermoplastic material in which, to provide cooling, a chemically inert liquid gas with a critical temperature of between −150 and +35° C., such as, e.g., nitrogen or carbon dioxide is evaporated in the hollow space of the hollow section.

When extremely cold nitrogen is used for internal cooling, it is necessary to be sure that nitrogen comes into contact with the plastic pipe only in gaseous form since liquid nitrogen can damage the inside wall of the pipe. In the case of extended operation or in the case of high nitrogen throughput, however, the danger exists that the nitrogen feeders will cool off greatly, which means that residue-free evaporation of the nitrogen can no longer be ensured.

DE-C-33 15 202, incorporated herein by reference, therefore proposes a device in which the exhaust nozzle for liquid nitrogen is encased by an evaporator element that is in thermal contact with the hot, extruded plastic pipe. The liquid nitrogen is sprayed from the nozzle to the evaporator element, is evaporated there, and is then fed via outlets in the evaporator element to the inner surface of the plastic pipe.

After extrusion, the plastic melt, which is still soft, flows downward under the action of gravity, in such a way that uneven wall thickness distribution develops over the periphery of the plastic pipe. This deformation of the pipe or the hollow section is effectively prevented by inner cooling. When liquid nitrogen is used, moreover, the extrusion rate can be increased over what is possible with water cooling.

When liquid nitrogen is run through the hot extruder head, a large temperature difference occurs between the liquid nitrogen, which has a temperature of −196° C., and the extruder head, which has a temperature of about 200° C. This requires a high insulation expense, but it cannot prevent nitrogen from exiting the depressurization nozzle in a pulsating manner, which results in the formation of droplets on the plastic pipe.

SUMMARY OF THE INVENTION

The object of this invention thus is to indicate a process of the above-mentioned type that avoids the drawbacks of the known processes. In particular, the invention is successful in dispersing the coolant in such a way that as uniform and good a heat transition as possible is achieved between the coolant and the inner wall of the hollow section. The risk of the hollow section being damaged by extremely cold, liquid coolant is eliminated, the extrusion speed is to be increased, and the technical expense, especially the insulation expense, is minimized in carrying out this process. A device is also provided for implementing this process.

On the process side, this object is achieved in that carbon dioxide that is in gaseous form is brought into heat exchange with the inner wall of the hollow section and in that solid carbon dioxide is brought into heat exchange with the inner wall of the hollow section only to the extent that the inner wall of the hollow section is not damaged.

According to the invention, carbon dioxide is used as a coolant, which generally is stored under pressure in liquid form in a supply tank. The liquid carbon dioxide is directed through the extruder head into the interior of the extruded hollow section and is depressurized there in one or more depressurization nozzles. When liquid or supercritical carbon dioxide is depressurized, a high-speed cooling jet that consists of carbon dioxide gas and carbon dioxide snow is produced. Sizeable carbon dioxide snow or dry ice particles can damage the surface of the extruded hollow section. The solid components that are contained in the cooling jet are therefore either kept away from the surface or evaporated, so that they do not come into contact with the surface of the plastic hollow section or are dispersed into the carbon dioxide gas so finely that damage to the surface of the hollow section cannot occur.

It has been found that damage to the section surface occurs only when a critical particle size that is dependent on, i.a., the temperature of the extruded section is exceeded. According to the invention, the solid carbon dioxide that is produced during expansion is therefore finely atomized, such that the resulting snow particles are sublimated as early as when they approach the section surface or such that the particles are so small that the section wall cannot be damaged.

Internal cooling with carbon dioxide instead of liquid nitrogen is significantly easier to handle under the conditions that exist in plastic extrusion, especially the high temperature of the extruder head, since the insulating wall can be minimized when the carbon dioxide feed is run through the extruder head.

The liquid or supercritical carbon dioxide is advantageously dispersed behind the extrusion tool in the hollow section and then depressurized. The liquid or supercritical carbon dioxide is dispersed onto several nozzles, especially preferably onto several nozzles that are arranged axisymmetrically with respect to the extruded hollow section or to an annular nozzle that is arranged coaxially with the hollow section. Owing to this dispersion of the carbon dioxide, a uniform cooling action is achieved over the entire periphery of the hollow section. Uneven wall thicknesses or deformation of the hollow section are thus avoided.

The depressurized carbon dioxide, i.e., carbon dioxide in gaseous form or carbon dioxide in gaseous form that is mixed with small carbon dioxide particles that do not damage the section wall is advantageously not only directed onto the inner wall of the hollow section, but is also guided along the inner wall of the hollow section. In this way, the heat transition between the inner wall of the hollow section and the carbon dioxide is intensified, and the cooling properties of the carbon dioxide are exploited as much as possible.

In a preferred variant, a twisting flow, i.e., a rotational movement component, is imposed upon the depressurized carbon dioxide. A coil-shaped or helical flow ensures even better dispersion of carbon dioxide over the periphery. Sinking of the carbon dioxide under the action of gravity and the associated uneven cooling of the hollow section are avoided.

It is also advantageous if the kinetic energy of the depressurized carbon dioxide that comes into contact with the inner wall basically corresponds to the kinetic energy of the carbon dioxide immediately after depressurization. The higher the kinetic energy of the depressurized carbon dioxide, i.e., the higher its speed, the more intense its cooling action on the freshly extruded section. As much as possible, then, optional deflection of the carbon dioxide flow of gas is therefore carried out in such a way that the rate of flow remains unchanged.

In the case of inner cooling with extremely cold coolants, the running of cold coolant through the hot extruder head creates technical problems with respect to insulation. To avoid these insulation problems, liquid carbon dioxide at ambient temperature is preferably directed into the extruder head. The requirements imposed on the insulation of the running of carbon dioxide through the extruder head are therefore considerably less stringent. Depending on the process conditions, especially the temperature of the extruder head and the carbon dioxide throughput, it is even possible to completely eliminate insulation.

Preferably, the extruded hollow section is cooled internally and externally. The outside cooling is usually done with water, but it can also be done with air or extremely cold gases such as nitrogen or carbon dioxide. If water cooling is not sufficient, outward cooling is also preferably done with carbon dioxide. By combining the inner cooling according to the invention with outside cooling, the extrusion process is improved both quantitatively and qualitatively. On the one hand, the hollow section is cooled more quickly, allowing the rate of extrusion to be increased, but on the other hand the section is uniformly cooled, thus preventing stress from developing in the section.

It has also proven advantageous to convert the solid carbon dioxide that is produced during depressurization into the gaseous state with the gas that is present inside the hollow section. After a specific travel distance, the gas inside the hollow section has already taken up a portion of the heat energy of the hollow section and therefore has a considerably higher temperature than the carbon dioxide that exits from the depressurization nozzle. If the carbon dioxide snow that is produced during depressurization is brought into thermal contact with this warmer gas, the snow will be sublimated. The carbon dioxide that is now in gaseous form can then enter into heat exchange with the hot extrudate as well. In this way, the cooling action of the carbon dioxide snow can also be used. Snow or ice particles thus cannot damage the extrudate surface.

If the depressurization nozzles are unfavorably arranged, flow dead zones, i.e., areas in which the gas flow is only very slight, can arise near the depressurization nozzles. In these areas, on the one hand, snow and ice accumulations, which can damage the hollow section, can form, and, on the other hand, the hollow section will be inadequately cooled in these areas. It has therefore proven advantageous to feed back a portion of the carbon dioxide in gaseous form into the area of the depressurization nozzles. Flow dead zones, e.g., behind the depressurization nozzles, and the associated drawbacks are avoided by the recirculation of the gas. The ratio between the gas that flows along the extrudate and the amount of carbon dioxide that is newly fed in via the depressurization nozzles increases, and cooling action improves.

In addition to the process, the invention also relates to a device for cooling extruded hollow sections, especially pipes, that are made of plastic with at least one feeder for liquid or supercritical carbon dioxide that runs through the extruder head into the interior of the hollow section and that has at least one depressurization nozzle.

According to the invention, opposite the depressurization nozzle, there is at least one deflecting element that brings about a deflection of the carbon dioxide that is produced during the depressurization of liquid or supercritical carbon dioxide toward or along the inner wall of the hollow section.

In this connection, a depressurization nozzle is defined as any device that facilitates the depressurization of liquid carbon dioxide. These also include specially designed nozzles, as well as simple pipes or pipe ends.

The deflecting element that is arranged opposite the depressurization nozzle or nozzles is designed preferably as a cone or frustum. When the carbon dioxide exits in the axial direction from the depressurization nozzles, the carbon dioxide strikes the cone or the frustum so that the carbon dioxide gas is deflected in the direction of the inner wall of the hollow section, while the carbon dioxide snow is retained on the cone or frustum. This embodiment ensures that the extruded hollow section is cooled only with carbon dioxide in gaseous form or with very small snow particles.

In addition to the deflecting element, the device according to the invention suitably has another deflecting ring, which is arranged coaxially with the hollow section. The deflecting ring is arranged in such a way that the carbon dioxide that has left the depressurization nozzle and that is deflected by the deflecting element to the inner wall is guided along the inner wall of the hollow section.

It has proven advantageous to provide in the extruded hollow section a guiding pipe which, with the hollow section, forms a flow channel for the depressurized carbon dioxide. The guiding pipe is used to ensure as good a heat transition as possible between the carbon dioxide and the extruded hollow section. A high rate of flow in the gap between the guiding pipe and the extruded hollow section, which makes possible a large heat transition coefficient, is produced by the guiding pipe. The guiding pipe also prevents the carbon dioxide from flowing through the center of the pipe, without adequately drawing heat from the extruded hollow section. The cross-sectional shape of the guiding pipe is generally matched to that of the hollow section to ensure a uniform flow-channel width over the entire periphery of the hollow section. Production reasons may, however, also dictate the use of round guiding pipes, for example, in the case of rectangular sections.

Within the framework of the invention, a device of the above-mentioned type is also proposed in which a guiding pipe which, with the hollow section, forms a flow channel for the depressurized carbon dioxide and which has openings at both axial ends is arranged in such a way that inside the guiding pipe suction is produced in the direction of the depressurization nozzle by the carbon dioxide that exits from the depressurization nozzle.

Suitably, to depressurize liquid or supercritical carbon dioxide, several nozzles that are arranged axisymmetrically with respect to the extruded hollow section or an annular nozzle that is arranged coaxially with the hollow section are provided. This arrangement allows uniform dispersion of carbon dioxide over the periphery of the hollow section and thus uniform cooling of the hollow section.

The larger the number of depressurization nozzles, the more uniformly the carbon dioxide can be dispersed in the hollow section. For structural reasons, the use of up to 8 nozzles is suitable. The use of more than 8 nozzles is generally unnecessary, but is also possible if the cooling must be very uniform and the hollow section is very large. It has been shown, surprisingly enough, that even with only a single depressurization nozzle, good and uniform cooling is achieved. The injection of carbon dioxide by 2 to 4 nozzles represents a good compromise between cooling that is as uniform as possible and a technical expense that is not too large.

To achieve optimum heat transition conditions, the guiding pipe should not be selected in too short a length. The guiding pipe advantageously has a length of between 0.5 m and 3 m. In this way, the cooling action of the carbon dioxide is used almost optimally. The formation of longer flow channels is only expensive to implement and leads to technical problems, especially during the startup procedure of the extrusion unit To produce a twisting flow of the depressurized carbon dioxide, it is advantageous to provide baffles or injection pipes. The latter are arranged especially advantageously on the outside of the guiding pipe. One or more baffles or other devices that impose a circular movement component on the carbon dioxide bring about even better dispersion of the cooling flow.

The injection pipes for producing a twisting flow are arranged preferably at an angle of 20° to 70°, especially preferably 30° to 60°, to the axis of the guiding pipe.

The width of the flow channel between the guiding pipe and the hollow section depends on the process conditions and is to be selected as a function of temperature and of the thickness of the extruded hollow section, as well as the requisite carbon dioxide throughput. In this connection, gap thicknesses of between 10 mm and 50 mm have proven to be advantageous.

The cooling of the hollow section is more uniform if a jacket pipe that forms a flow channel with the guiding pipe is provided. In this way, the newly fed carbon dioxide gas and the gas that is already present inside the hollow section are mixed in the flow channel between the jacket pipe and guiding pipe and are dispersed over the periphery of the hollow section. This variant is advantageous especially if gas is sucked in through the interior of the guiding pipe and is fed to the depressurization nozzle.

If the gas that is newly fed through the depressurization nozzles is directed through injection pipes to the hollow section, it is advantageous for the jacket pipe to project in the extrusion direction over the end of the injection pipe. If only a few, and especially if only one depressurization nozzle is used, a portion of the hollow section that is near the exiting area of the injection pipe is cooled more strongly than the rest of the section. By extending the jacket pipe according to the invention over the end of the injection pipe, mixing of the newly fed and the already present carbon dioxide gases as well as better dispersion of the gas are achieved.

Significant advantages over the prior art are achieved by the invention. The proposed cooling with carbon dioxide improves the wall thickness distribution, the roundness, or in general the geometry of the extruded hollow section. Very efficient cooling, which makes it possible to increase the extrusion speed and thus the output of an extrusion line, is achieved. The cooling of the hollow section is accomplished very uniformly, which means, especially if cooling is done from the inside and the outside, that low stresses occur in the hollow section. In comparison to conventional cooling processes with liquid nitrogen, the cooling according to the invention causes no problems whatsoever in the insulation of the coolant lead-in through the extruder head. The invention is suitable for cooling all extrudable plastics, for example, PVC, PE, or PP. Especially advantageous is the use of the invention in the extrusion of plastic sections or plastic pipes with large dimensions and large wall thicknesses.

BRIEF DESCRIPTION OF THE DRAWINGS

The invention as well as further details of the invention are explained in more detail below based on the embodiments that are depicted in the diagrammatic drawings.

Here, in detail.

DETAILED DESCRIPTION

Figure 1:
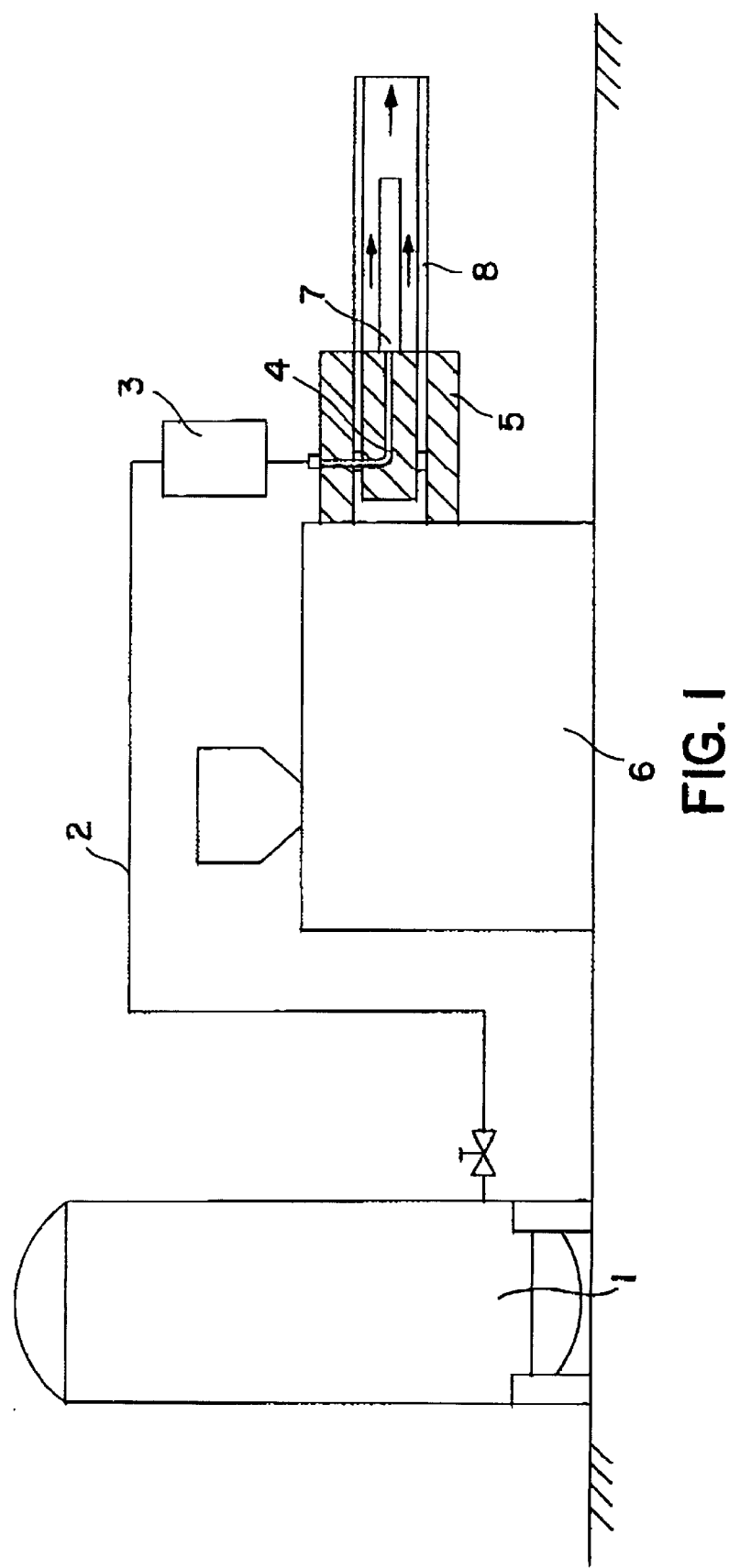
FIG. 1 shows the basic principle of inner cooling with carbon dioxide according to the invention.

FIG. 1 diagrammatically shows the basic principle of inner cooling of extruded pipes. Carbon dioxide, which is stored under pressure in liquid form in a supply tank 1, is used as a coolant. The liquid carbon dioxide is directed into extruder head 5 via a feeder 2 and a metering plate 3. The carbon dioxide, which has an ambient temperature of about 20° C., is fed using a high-grade steel pipe 4 which provides a passage through extruder head 5 of cooling device 7. Using this cooling device 7, a plastic pipe 8 that is extruded from extruder 6 through extruder head 5 is cooled from inside.

Figure 2:
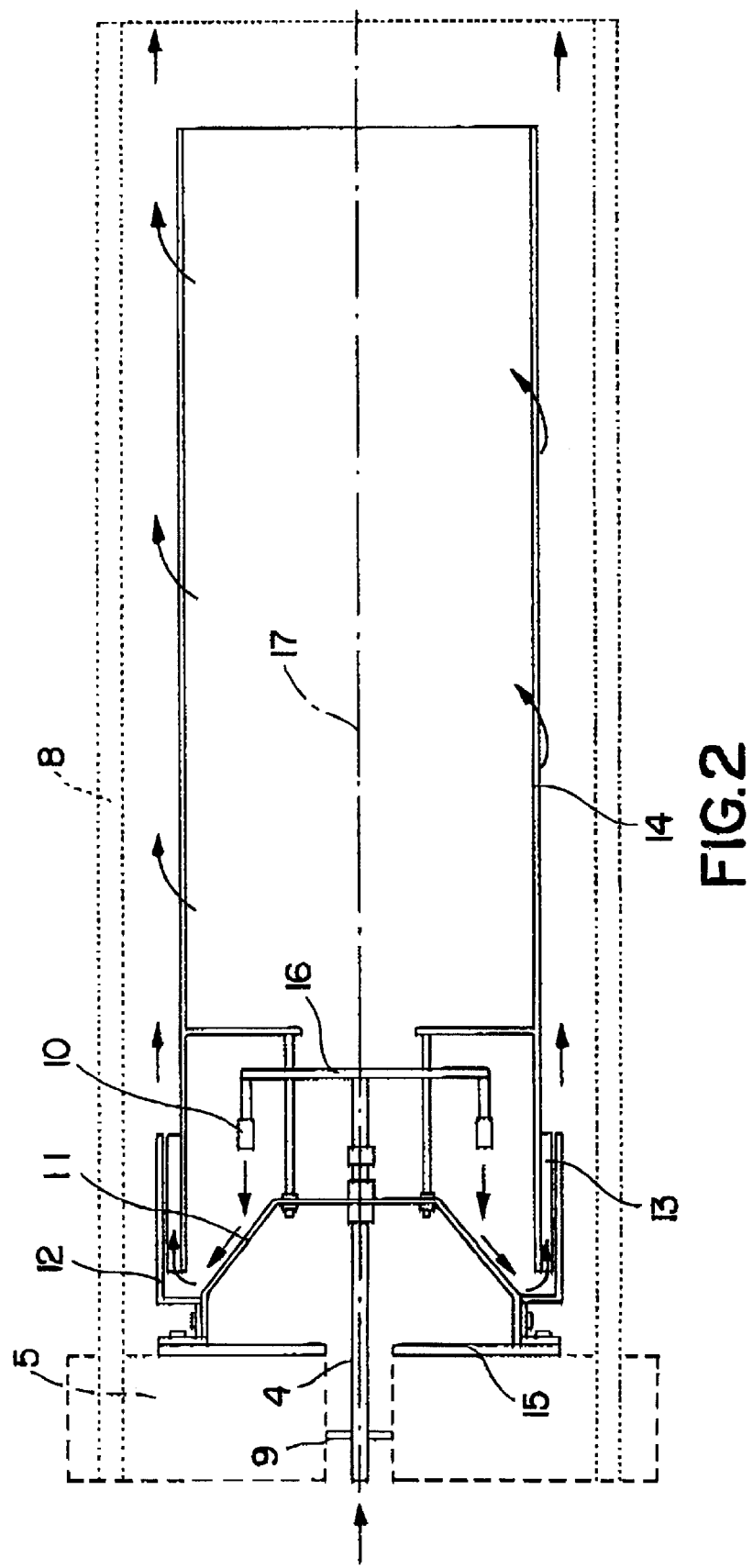
FIG. 2 shows a detailed illustration of the cooling device according to the invention.

FIG. 2 depicts cooling device 7 in detail. High-grade steel pipe 4 forming the passage through the extruder head 5 is insulated from the extruder head by spacer rings 9. Said spacer rings 9 consist of a temperature-resistant insulating material, e.g., teflon, and prevent direct contact between the carbon dioxide and extruder head 5 and thus excessive cooling of extruder head 5. High-grade steel pipe 4 ends in a dispersing piece 16, which has several depressurization nozzles 10 that are arranged axisymmetrically around axis 17. In dispersing piece 16, the liquid carbon dioxide is dispersed uniformly onto depressurization nozzles 10 to achieve good peripheral dispersion of the carbon dioxide. In depressurization nozzles 10, the liquid or supercritical carbon dioxide expands, whereby a cooling jet with a high rate of flow is produced. The cooling jet consists of a mixture of carbon dioxide snow and carbon dioxide gas.

Depressurization nozzles 10 are arranged with their outlets facing opposite the direction of extrusion, such that during the depressurization of the liquid or supercritical carbon dioxide, hot carbon dioxide gas is sucked from the side that faces away from extruder head 5. This has the advantage that during depressurization, owing to the mixing with the sucked-in warm gas, mainly carbon dioxide in the gaseous state and only a very small proportion of carbon dioxide in the solid state are produced.

Thus, the dry-ice particles and carbon dioxide snow particles that are still contained to a small extent in the coolant jet do not come directly into contact with pipe surface 8 the coolant jet of individual depressurization nozzles 10 is deflected. For this purpose, depressurization nozzles 10 are directed to a frustum 11, onto which the cooling jet from each depressurization nozzle 10 exits. The exiting carbon dioxide snow collects on the surface of frustum 11, from which it is entrained and/or is sublimated in finely dispersed form by the carbon dioxide gas.

With insertion of an insulating plate 15, frustum 11 is fastened to extruder head 5 in such a way that frustum 11 and extruder head 5 are thermally separated to avoid excessive cooling of extruder head 5. The cooling stream that consists of carbon dioxide gas is deflected by a deflecting ring 12, such that it flows along the inside wall of extruded pipe 8.

Flow guiding pipe 14 forms a cylindrical baffle which has a length of 2 m and is used to achieve as good contact as possible between the carbon dioxide and the inner wall of extruded pipe 8. A high rate of flow is produced by guiding pipe 14 in the gap between guiding pipe 14 and extruded pipe 8, which makes possible a large heat transition coefficient. At its end that faces extruder head 5, guiding pipe 14 has baffles 13 which produce a twisting flow of carbon dioxide. The twisting flow keeps carbon dioxide from sinking downward under the action of gravity and ensures a uniform dispersion of carbon dioxide in pipe 8.

Figure 3:
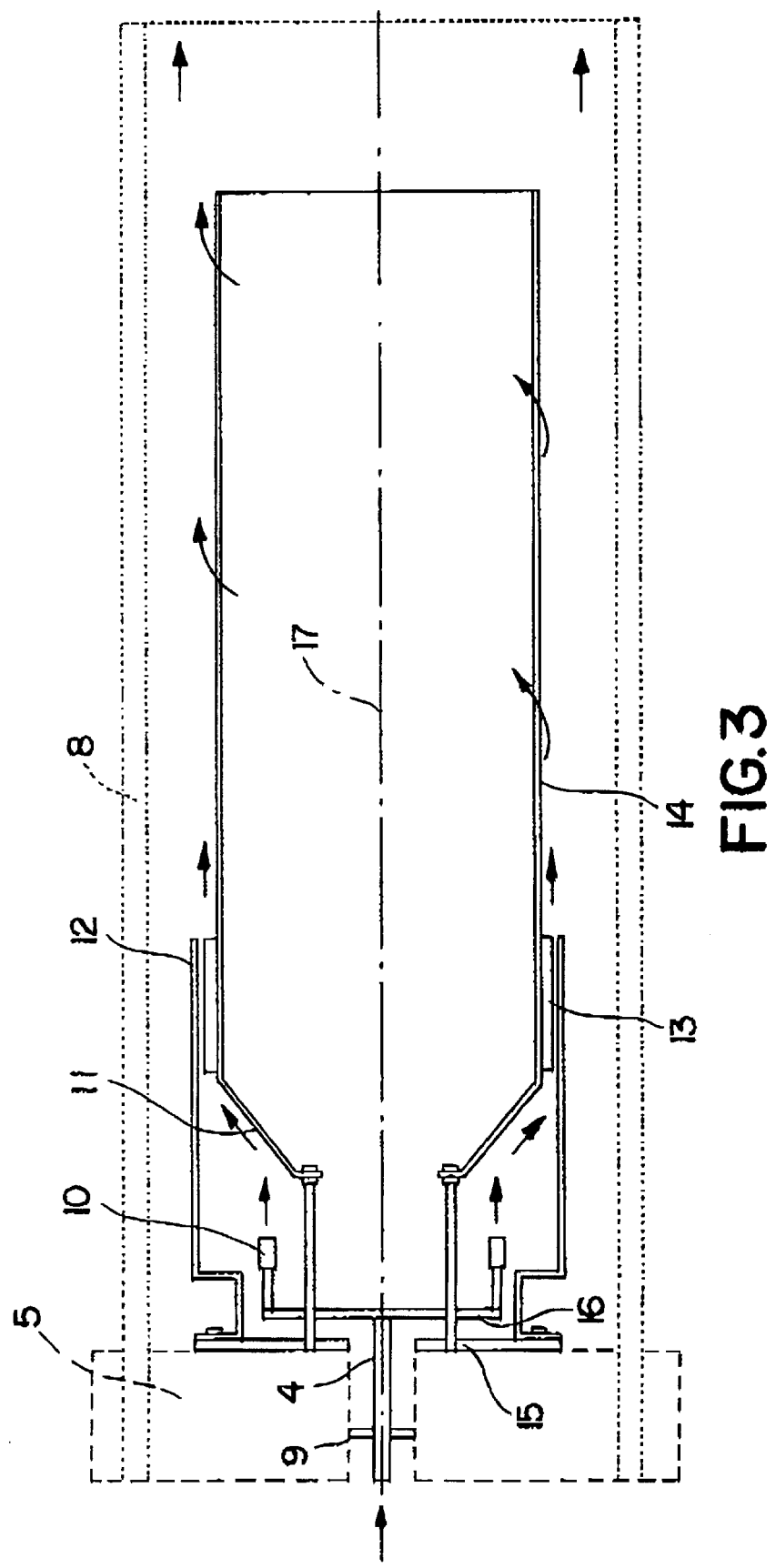
FIG. 3 shows an alternative configuration of the cooling device.

By way of example, FIG. 3 depicts another embodiment of cooling device 7. Feeder 4 for the liquid carbon dioxide again ends in a dispersing piece 16, which has a considerable number of depressurization nozzles 10 that are arranged axisymmetrically with respect to axis 17. Instead of depressurization nozzles 10, it is also advantageous to use a concentric nozzle that is arranged axisymmetrically with respect to axis 17.

The cooling device that is depicted in FIG. 3 is basically distinguished from that shown in FIG. 2 in that the exit direction of the carbon dioxide runs from the depressurization nozzles in the extrusion direction of pipe 8 and not opposite to the extrusion direction. The other components of the cooling device that is depicted in FIG. 3 that are provided with references correspond to the parts that are shown in FIG. 2.

Figure 4:
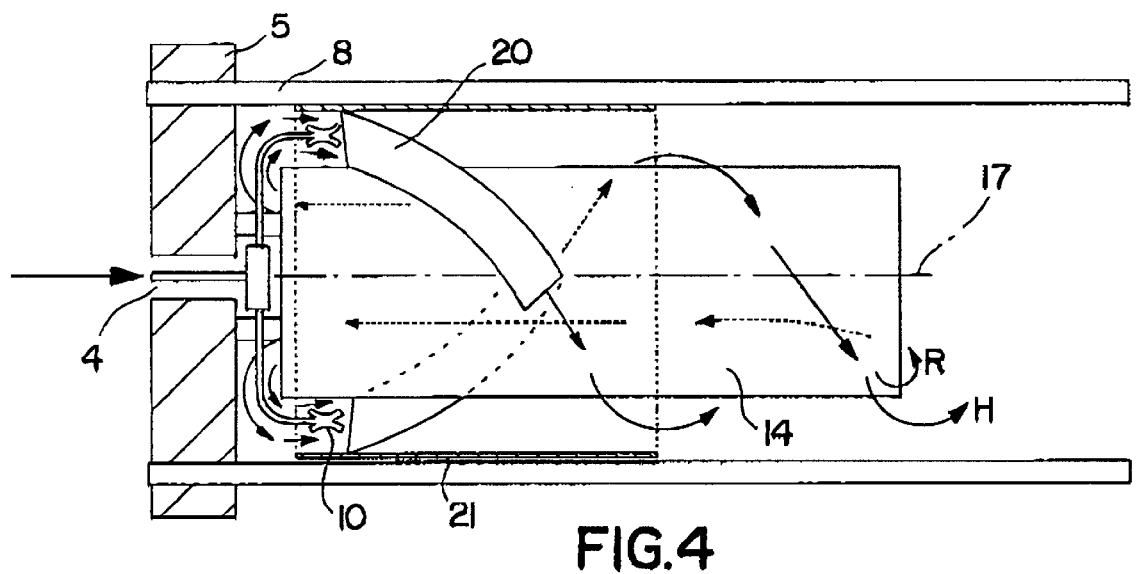
FIG. 4 shows another embodiment of the invention.

FIG. 4 shows another embodiment of the invention. The liquid or supercritical carbon dioxide expands in depressurization nozzles 10 and, in so doing, entrains gas from the surrounding area of nozzles 10. Opposite two depressurization nozzles 10, in each case there is an injection pipe 20, into which the gas-snow mixture that exits from nozzles 10 and the entrained gas flow. The gas that is entrained from the surrounding area is mixed with the depressurized carbon dioxide and produces the sublimation of the solid carbon dioxide in the gas-snow mixture. At the end of injection pipe 20, a carbon dioxide jet in gaseous form exits at high speed.

Figure 5:
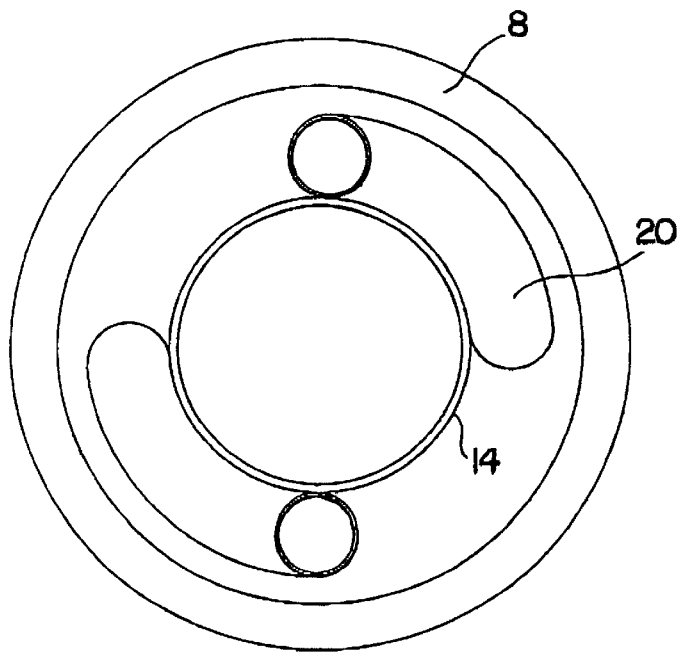
FIG. 5 shows a section through FIG. 4.

Injection pipes 20 are arranged tangentially to the guiding pipe, as can be seen in FIG. 5, at an angle of 45° to center line 17 of the guiding pipe. Because of the curvature of pipe 20, a twisting flow, which is maintained up to the end of guiding pipe 14, is imposed on the carbon dioxide gas that exits from pipes 20. Jacket pipe 21, which with guiding pipe 14 forms an annular flow channel, is provided coaxially with guiding pipe 14. The end of jacket pipe 21 projects in the axial direction over the end of injection pipe 20, in such a way that the gas that exits from pipes 20 does not directly hit the inner wall of hollow section 8, but first flows into the gap between jacket pipe 21 and guiding pipe 14. In this case, the gas that exits from pipes 20 is dispersed over the periphery of guiding pipe 14 and is mixed with the gas that is already present In this way, a uniform cooling action over the entire periphery of hollow section 8 is achieved after the carbon dioxide gas exits from jacket pipe 21.

Guiding pipe 14 is open at both faces. Main part H of the gas that flows into the gap between guiding pipe 14 and hollow section 8 also flows further along hollow section 8 after reaching the end of guiding pipe 14. A part R of the gas is sucked from nozzle flow 10, however, and flows back through the interior of guiding pipe 14 to nozzles 10. The gas flow is indicated by arrows in FIG. 4. Flow dead zones with optional snow accumulations in the area of extruder head 5 are avoided by the shape of this backflow.

In addition to the embodiments of the cooling device that are shown, numerous other variants are possible. For example, it can be advantageous to arrange the depressurization nozzles and/or the deflecting elements and/or the deflecting ring in such a way that the carbon dioxide flows opposite to the extrusion direction along the inner wall of the hollow section, thus ensuring weaker cooling. This can be advantageous in the case of hollow sections in which stresses develop in the case of very quick cooling. If this danger does not exist, it is advantageous, however, to arrange several of the cooling devices according to the invention in the extrusion direction one behind the other. The carbon dioxide that is directed into the interior of the hollow section is thus dispersed onto a considerable number of depressurization nozzles that are arranged axially, radially and/or azimuthally.

The entire disclosure of all applications, patents and publications, cited above and below, and of corresponding German application No. 197 04 363.1, filed Feb. 5, 1997, German application No. 197 36 644.9, filed Aug. 22, 1997, and European application No. 97107226.9, filed Apr. 30, 1997, are hereby incorporated by reference.

What is claimed is:

1. A process for cooling extruded plastic hollow sections having inner walls, the plastic hollow sections being useful for making pipes, comprising:

directing liquid or supercritical carbon dioxide through an extruder head by disbursing the liquid or supercritical carbon dioxide from several nozzles that are arranged axisymmetrically with the extruded hollow section in or with an annular nozzle that is arranged coaxially with the hollow section, while the hollow sections are extruded therefrom, and depressurizing the carbon dioxide before the carbon dioxide comes into contact with the inner wall so that carbon dioxide in gaseous and solid form is produced to cool the interior of the plastic hollow sections as the sections are extruded by the extruder head;

wherein the carbon dioxide that is in gaseous form is brought into heat exchange with the inner wall of the hollow sections only to the extent that the inner wall of the hollow sections is not damaged.

2. A process according to claim 1, wherein the depressurized carbon dioxide is directed to a deflecting element.

3. A process according to claim 2, wherein the depressurized carbon dioxide is guided along the inner wall of the hollow section.

4. A process according to claim 3, wherein a twisting flow is imposed on the depressurized carbon dioxide.

5. A device for cooling extruded hollow sections that are made of plastic and are useful as pipe, comprising:

at least one feeder for liquid or supercritical carbon dioxide, which feeder runs through an extruder head into the interior of a hollow section and which has at least one depressurization nozzle; at least one deflecting element for ensuring the deflection of the carbon dioxide gas that is produced during the depressurization of liquid or supercritical carbon dioxide in the direction of or along an inner wall of the hollow section, the deflecting element being located opposite the depressurization nozzle.

6. A device according to claim 5, wherein the deflecting element has a conical or frustoconical shape.

7. A device according to claim 5, wherein a deflecting ring coaxially with the hollow section is provided, the deflecting ring, in combination with the deflecting element, causing the deflection of the carbon dioxide that exits from depressurization nozzle along the inner wall of hollow section.

8. A device according to claim 5, wherein a guiding pipe is provided having a hollow section forming a flow channel for the depressurized carbon dioxide.

9. A device for cooling extruded hollow sections that are made of plastic and are useful as pipes, comprising:

at least one feeder for liquid or supercritical carbon dioxide, which feeder runs through an extruder head into the interior of the hollow section and which feeder has at least one depressurization nozzle;

a guiding pipe, which with the hollow section forms a flow channel for the depressurized carbon dioxide, said flow channel having openings at both axial ends, the flow channel being inside guiding pipe to produce suction in the direction of the depressurization nozzle by the carbon dioxide that exits from depressurization nozzle.

10. A device according to claim 9, wherein several nozzles are arranged axisynmnetrically with respect to the extruded hollow section or wherein an annular nozzle is arranged coaxially with the hollow section.

11. A device according to claim 10, wherein the guiding pipe is between 0.5 m and 3 m in length.

12. A device according to claim 11, wherein the outlet of depressurization nozzle is directed opposite to the extrusion direction.

13. A device according to claim 12, wherein at least one baffle or injection pipe configured to produce a twisting flow of the depressurized carbon, is provided.

14. A device according to claim 13, wherein the angle between the outlet of the injection pipe and axis of guiding pipe is 20° to 70°.

15. A device according to claim 14, wherein one to eight, and preferably two to four, depressurization nozzles are provided.

16. A device according to claim 15, wherein a jacket pipe surrounding the guiding pipe provides a flow channel for the carbon dioxide therebetween.

17. An apparatus useful for forming a hollow plastic section, comprising:

an extruder through which the hollow plastic section is extruded;

a source of liquid carbon dioxide or supercritical carbon dioxide;

a passage from the source of liquid or supereritical carbon dioxide extending through the extruder into the area defined by the inner wall of the hollow plastic section;

at least one depressurization nozzle connected to the passage through the extruder for allowing the carbon dioxide to expand into carbon dioxide gas and carbon dioxide snow within the hollow plastic section; and a deflector aligned with the nozzle for deflecting the carbon dioxide gas and carbon dioxide snow from the nozzle along the inner wall of the hollow plastic section.

18. An apparatus according to claim 17 firer comprising a cylindrical baffle aligned with the deflector for providing an annular space between the inner wall of the hollow plastic section and the cylindrical baffle whereby the carbon dioxide gas and carbon dioxide snow spiral around the cylinder within the space between the cylinder and hollow plastic section.

19. The apparatus of claim 18, wherein the cylinder is hollow with openings at both ends.

20. The apparatus of claim 19, wherein the cylinder is surrounded by an annular shielding cylinder in radial spaced relation thereto to prevent carbon dioxide snow from impinging directly on the inner wall of the hollow plastic section.

21. The apparatus of claim 20, wherein the cylinder projects axially beyond the annular shielding cylinder.

22. A process for cooling extruded plastic hollow sections useful for making pipes, comprising:

directing the liquid or supercritical carbon dioxide at ambient temperature through an extruder head, while the hollow sections are extruded therefrom, and depressurizing the carbon dioxide in gaseous form so that carbon dioxide in gaseous and solid form is produced to cool the interior of the plastic hollow sections as the sections are extruded by the extruder head by bringing into thermal contact with the inner walls of the hollow sections, the kinetic energy of the carbon dioxide, which kinetic energy basically corresponds to the kinetic energy of the carbon dioxide immediately after depressurization;

wherein the carbon dioxide that is in gaseous form is brought into heat exchange with the inner walls of the hollow sections, and wherein the solid carbon dioxide is brought into heat exchange with the inner walls of the hollow sections only to the extent that the inner walls of the hollow sections are not damaged.

23. A process according to claim 22, wherein the hollow section is cooled internally and externally.

24. A process according to claim 23, wherein the liquid or supercritical carbon dioxide is depressurized in such a way that it has a movement component that is opposite to the extrusion direction.

* * * * *